(12) United States Patent
Koike et al.

(10) Patent No.: US 12,518,240 B2
(45) Date of Patent: Jan. 6, 2026

(54) DELIVERY SYSTEM

(71) Applicant: TOYOTA JIDOSHA KABUSHIKI KAISHA, Aichi-ken (JP)

(72) Inventors: Uori Koike, Saitama (JP); Yuta Itozawa, Nagoya (JP); Takashi Izumi, Tokyo-to (JP); Tatsuya Tsubakimoto, Tokyo-to (JP); Satoshi Komamine, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 46 days.

(21) Appl. No.: 18/732,631

(22) Filed: Jun. 4, 2024

(65) Prior Publication Data

US 2024/0412151 A1   Dec. 12, 2024

(30) Foreign Application Priority Data

Jun. 7, 2023 (JP) ................................. 2023-093778

(51) Int. Cl.
| | | |
|---|---|---|
| *G06Q 10/083* | (2024.01) | |
| *A47G 29/14* | (2006.01) | |
| *B60P 3/00* | (2006.01) | |

(52) U.S. Cl.
CPC ........... *G06Q 10/083* (2013.01); *A47G 29/14* (2013.01); *B60P 3/007* (2013.01)

(58) Field of Classification Search
CPC ........ G06Q 10/083; A47G 29/14; B60P 3/007
See application file for complete search history.

(56) References Cited

U.S. PATENT DOCUMENTS

| | | | | |
|---|---|---|---|---|
| 9,741,010 | B1* | 8/2017 | Heinla | G06Q 10/083 |
| 10,902,375 | B2* | 1/2021 | Wilkinson | G07C 9/00896 |
| 11,978,008 | B2* | 5/2024 | Felice | G06Q 10/0832 |
| 12,183,141 | B1* | 12/2024 | Maciolek | G07C 9/00912 |
| 2009/0138122 | A1* | 5/2009 | Wagner | G07F 17/0092 |
| | | | | 700/226 |
| 2018/0165638 | A1* | 6/2018 | Wilkinson | G06F 21/32 |
| 2020/0237946 | A1* | 7/2020 | Shell | A61L 2/28 |

FOREIGN PATENT DOCUMENTS

| | | |
|---|---|---|
| JP | 2021-071884 A | 5/2021 |
| JP | 2022-018717 A | 1/2022 |
| JP | 2023-000779 A | 1/2023 |

* cited by examiner

*Primary Examiner* — Ramsey Refai
(74) *Attorney, Agent, or Firm* — HAUPTMAN HAM, LLP

(57) ABSTRACT

A delivery system according to the present disclosure is a delivery system configured to deliver a package, privacy information being attached to the package, the delivery system including: a mobile robot configured to deliver the package; a transfer mechanism configured to transfer the package delivered by the mobile robot to a storage place or transfer the package located in the storage place to the mobile robot; and a detection unit configured to detect whether or not a person is present near the storage place, in which the package is transferred in a transfer form in which the privacy information is protected from being revealed to the person present near the storage place.

5 Claims, 5 Drawing Sheets

BEFORE ROTATION

AFTER ROTATION

BEFORE ROTATION

AFTER ROTATION

BEFORE TRANSFER

AFTER TRANSFER

DELIVERY SYSTEM

CROSS REFERENCE TO RELATED APPLICATIONS

This application is based upon and claims the benefit of priority from Japanese patent application No. 2023-093778, filed on Jun. 7, 2023, the disclosure of which is incorporated herein in its entirety by reference.

BACKGROUND

This present disclosure relates to a delivery system.

Patent Literature 1 (Japanese Unexamined Patent Application Publication No. 2021-71884) discloses a delivery robot for delivering packages. The delivery robot includes a mechanism for locking (fixing) a package mounted on a frame body to the frame body.

This locking mechanism can prevent a package from falling and a package from being pulled out by a third party other than a receiver of the package while the delivery robot is traveling.

SUMMARY

When a delivery robot transfers a package to a storage place, information about a receiver's privacy may be seen by people present near it. For example, a label indicating personal information such as the address and the name of a receiver may be attached to a package. Alternatively, a logo from which the content of a package can be identified may be attached to the package. In a transfer of a package, privacy information such as personal information of a receiver and the content of a package may be seen by people nearby. In addition, a package may be stolen when it is estimated that something expensive will be in a package according to a logo of the product or the brand.

The present invention has been made in view of the aforementioned circumstances, and an object thereof is to provide a delivery system capable of protecting privacy information.

A delivery system according to the present disclosure is a delivery system configured to deliver a package, privacy information being attached to the package, the delivery system including: a mobile robot configured to deliver the package; a transfer mechanism configured to transfer the package delivered by the mobile robot to a storage place or transfer the package located in the storage place to the mobile robot; and a detection unit configured to detect whether or not a person is present near the storage place, in which the package is transferred in a transfer form in which the privacy information is protected from being revealed to the person present near the storage place.

According to the present disclosure, it is possible to provide a delivery system capable of protecting privacy information.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
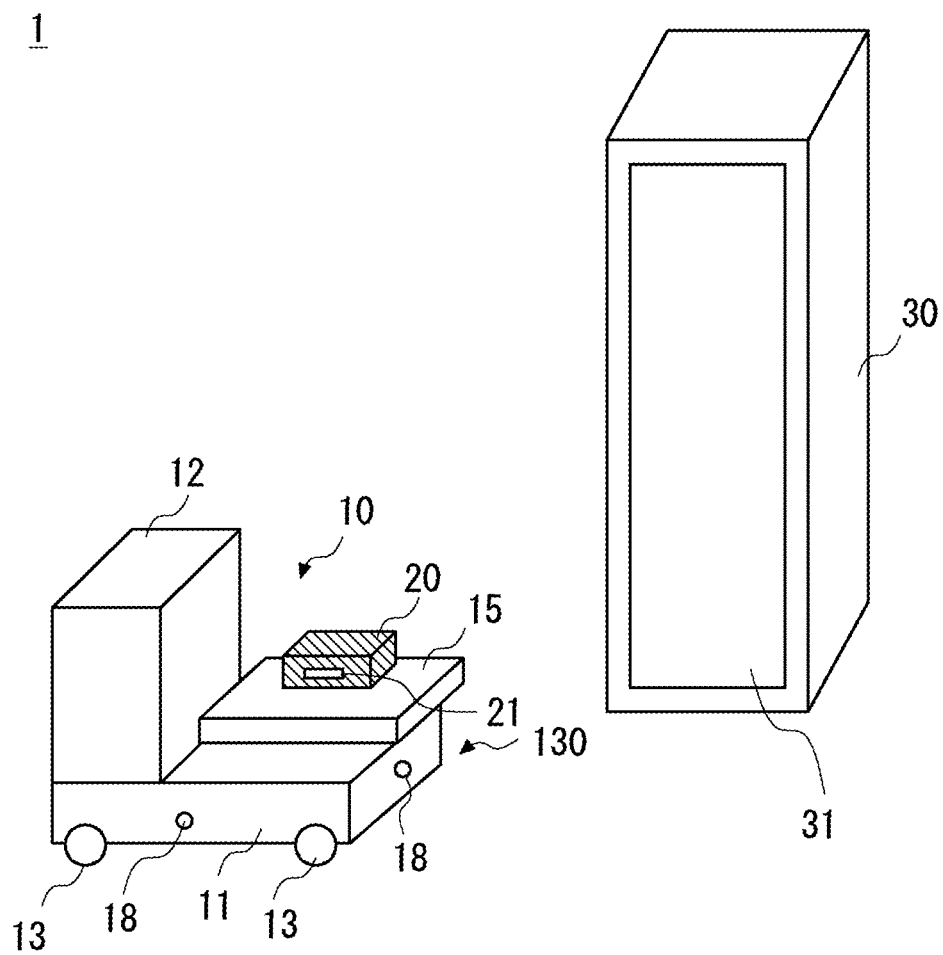
FIG. 1 is a schematic perspective view for explaining a delivery system.

Hereinafter, a delivery system and a method therefor will be described with reference to FIG. 1. FIG. 1 is a schematic perspective view for explaining an outline of a delivery system 1. The delivery system 1 is used for the last one mile in logistics, i.e., logistics services from a final base to an end user (also referred to simply as a user). For example, the delivery system 1 is utilized in a facility including rooms of users and passages. Specifically, the delivery system 1 is utilized in an apartment building such as a condominium or an accommodation facility such as a hotel.

The delivery system 1 includes a delivery robot 10 and a storage shelf 30. The delivery robot 10 travels through a passage A of a facility. The storage shelf 30 is installed, for example, in each room of an apartment building where a user U lives. The storage shelf 30 is installed in each house of an apartment building. The storage shelf 30 serves as a storage place for storing an article 20. For example, the storage shelf 30 is a smart post or a delivery locker. The delivery robot 10 can complete delivery without having to hand an article to an end user. For example, when a user purchases the article 20 through Internet mail order or the like, the delivery robot 10 delivers the article 20 to the user (purchaser) who is a receiver.

The delivery robot 10 moves to a plurality of storage shelves 30, stops in front of each of the storage shelves 30, and stores the article 20 in each of the storage shelves 30. This operation can also be referred to as delivery. Further, the delivery robot 10 moves to a plurality of storage shelves 30, stops in front of each of the storage shelves 30, and takes the article 20 out of the storage shelf 30, and conveys the article 20 taken out. This operation can also be referred to as a pickup. The delivery robot 10 (or the storage shelf 30) includes a mechanism for delivering articles to and from the storage shelf 30. The delivery robot 10 also includes various types of sensors, and it can detect the storage shelf 30 and obstacles in the passage, and move autonomously. A known object recognition technique can be used.

The storage shelf 30 may include a plurality of shelves (not shown) capable of housing the articles 20. The storage shelf 30 is installed, for example, on the passage side of each of the rooms of a building or an apartment building. Alternatively, the storage shelf may be installed near the entrance of an apartment building. The delivery robot 10 accesses the storage shelf 30 from the passage side thereof to take the article 20 out of it or put the article 20 into it. A resident (a user) accesses the storage shelf 30 from the room to take the article 20 out of it or put the article 20 into it.

For example, the storage shelf 30 includes a door 31. The door 31 is provided on the passage side. The delivery robot 10 opens the door 31 and takes the article 20 out of the storage shelf 30 or puts it into the storage shelf 30 from the passage side. The door 31 may be, for example, a horizontally openable shutter, a vertically openable shutter, a single swing door, or a double swing door. Here, a description will be given in accordance with the assumption that the door 31 can be opened and closed in either the left or the right direction. Further, the storage shelf 30 may include an additional door on the room side. In this case, a user can open the door from inside the room and take out the article 20.

The door 31 may be lockable. For example, the user U or the delivery robot 10 may lock/unlock the door 31. By doing so, for example, the article 20 can be prevented from being stolen. The delivery robot 10 may control opening and closing of the door 31. For example, when the delivery robot 10 moves to the vicinity of the storage shelf 30, the delivery robot 10 sends a command to the storage shelf 30 to open the door 31 of the storage shelf 30. Radio communication between the delivery robot 10 and the storage shelf 30 is enabled.

As shown in FIG. 1, the delivery robot 10 includes a base part 11 including a plurality of wheels 13 (may be collectively referred to as a carriage part 130), a storage part 12 provided on the base part 11 and in which a large number of articles 20 can be stored, and a mounting table 15 which is provided on the base part 11 and on which each of the articles 20 is mounted. The base part 11 may be a substantially rectangular elongated plate-like member. Further, one or more sensors 18 that detect or capture an image of an object or the like present in all directions of the delivery robot 10 and detect a position of an obstacle on a road, a position of a storage shelf, or the like are provided at any place in the delivery robot 10 (the base part 11 in this example). The sensor 18 may be, for example, a camera or Light Detection And Ranging (LiDAR). Further, the sensors 18 is provided to detect that a person is present near the delivery robot 10 and the storage shelf 30.

Further, the delivery robot 10 may utilize data from a sensor 218 (see FIG. 2) installed in a place other than the delivery robot 10. The sensor 218 is a monitoring camera or the like installed in a facility. Alternatively, when more than one robot is utilized in a facility, the sensor 218 may be installed in another robot. The delivery robot 10 receives data from the sensor 218 through a wireless network.

The mounting table 15 includes a mechanism for mounting one article 20 taken out of the storage part 12 and storing this article 20 on one desired shelf of the storage shelf 30. Further, the mounting table 15 can be moved up and down along a vertical direction, and includes an extendable arm (not shown) which can be extended and contracted on a horizontal direction axis. The extendable arm is configured so as to be movable in the front-rear and right-left directions. In some embodiments, the mounting table 15 may be configured so as to be rotatable about a vertical axis. The mounting table 15 may also be configured so as to be movable in all directions (360°) in a state in which the article 20 is mounted thereon. However, as shown in FIG. 1, since the storage part 12 is disposed on one side of the base part 11, the mounting table 15 cannot be moved in a certain direction of the storage part 12 (also referred to as a rear side in this specification).

Note that the delivery system 1 may include a management server (not shown) that controls the travelling of the delivery robot 10. In this case, the management server includes a control unit 100 (see FIG. 2) connected to the delivery robot 10 through a network. In another embodiment, the control unit of the management server and the control unit of the delivery robot can achieve the present disclosure by distributing the functions thereof.

A label 21 is attached to the article 20. Here, the label 21 is attached to the side surface of the article 20. For example, the label 21 is a self-adhesive mailing label attached to a cardboard box or the like that houses a delivery. The label 21 includes privacy information such as the address and the name of a receiver. Therefore, a nearby person P can see the privacy information described in the label 21. Further, the privacy information is not limited to personal information of a receiver, and may also be information by which the details of an article can be identified. For example, the privacy information may be a product logo, a brand, or the like. Further, the privacy information may be printed directly on an outer box such as a cardboard box.

Figure 2:
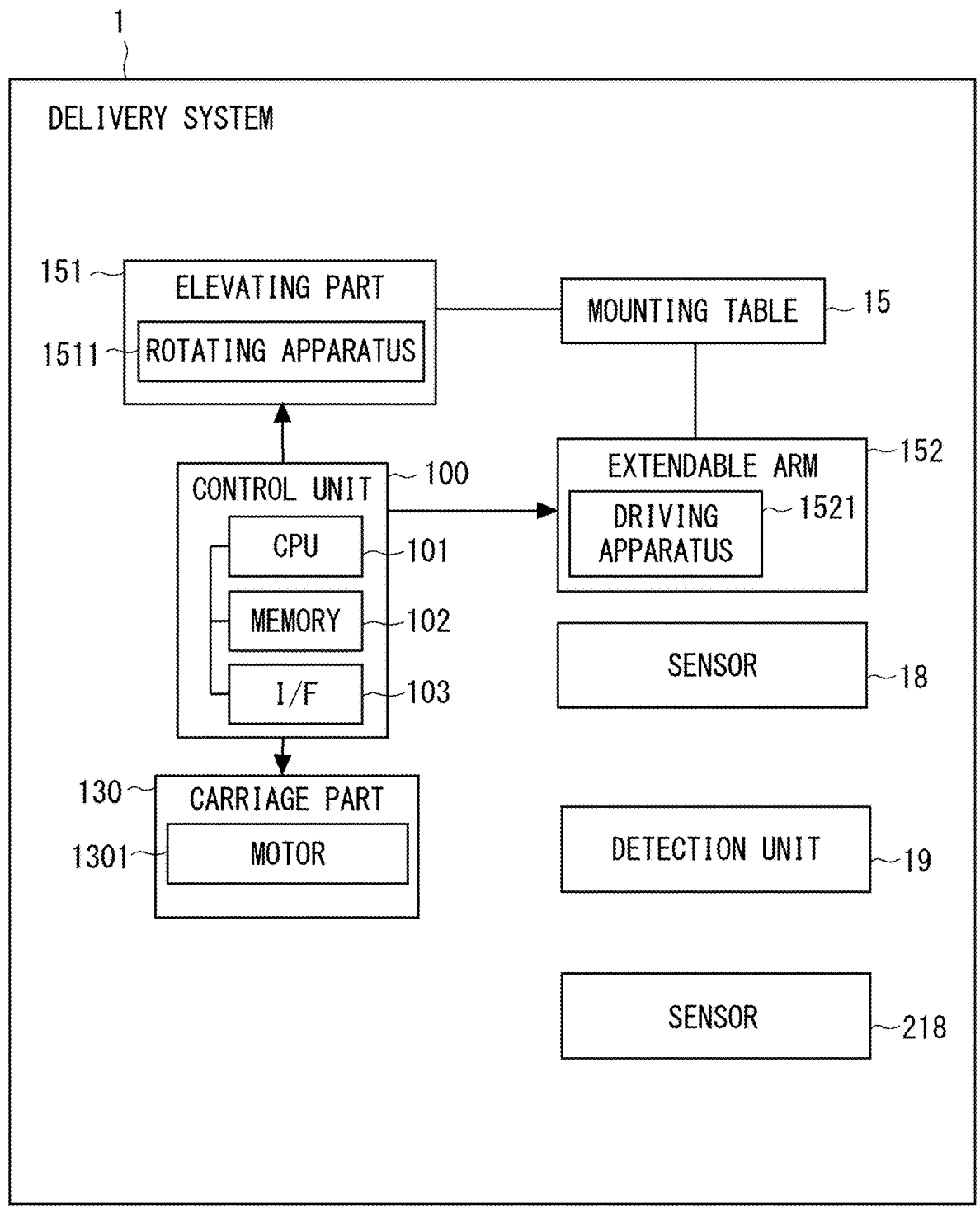
FIG. 2 is a functional block diagram for explaining a configuration of the delivery system.

FIG. 2 is a block diagram for explaining functions of the delivery system 1. The delivery system 1 includes the control unit 100. The control unit 100 may be provided in the delivery robot 10 or a management server. The control unit 100 receives sensor signals from the sensors 18 and 218 connected thereto through a wired or wireless network and controls a normal operation of the delivery system that includes the delivery robot including the carriage part 130, an elevating part 151, an extendable arm 152, and the like. In some embodiments, the control unit 100 can control a door on the front surface of the storage shelf and an operation of a manipulator provided inside the door.

The carriage part 130 includes the base part 11, the driving wheels 13 (see FIG. 1) rotatably provided in the base part 11, and motors 1301 that rotatably drive the respective driving wheels 13. Each of the motors 1301 rotates a respective one of the driving wheels 13 through a speed reducer or the like. Each of the motors 1301 rotates a respective one of the driving wheels 13 in accordance with a control signal sent from the control unit 100. Each of the motors 1301 rotates a respective one of the driving wheels 13 in accordance with a control signal sent from the control unit 100, thereby enabling the base part 11 to move to any position. Note that the above-described configuration of the carriage part 130 is merely an example, and the configuration of the carriage part 130 is not limited to this example. For example, the number of driving wheels of the carriage part 130 and the number of driven wheels of the carriage part 130 may be any number, and any configuration in which the base part 11 can be moved to any position can be used.

The mounting table 15 moves up and down by the elevating part 151 extending and contracting along the vertical axis. The elevating part 151 includes a rotating apparatus 1511. The extendable arm 152 is attached to the mounting table 15. The extendable arm 152 includes an arm body and a driving apparatus 1521. The driving apparatus 1521, which is attached to an internal part (not shown) of the mounting table 15, moves the arm body in the horizontal direction. The driving apparatus 1521 may further include a mechanism that rotates the arm body around the axis.

The sensor 18 is provided at any place in the delivery robot 10 including the carriage part 130 and the like. The sensor 18 is, for example, a camera and can acquire captured images. The sensor 18 may be, for example, Light Detection And Ranging (LiDAR). The sensor 18 can detect the presence of passages, obstacles, people, storage shelves, and the like. The sensor 18 may include a movement detection sensor that detects movement of the carriage part 130 and a height detection sensor that detects a height of the mounting table 15.

The delivery robot 10 may use data from the sensor 218 installed in a place other than the delivery robot 10. The sensor 218 is a monitoring camera installed in an elevator, a staircase, a passage, or the like of a facility. Alternatively, when more than one robot is used in the facility, the sensor 218 may be installed in another robot. The delivery robot 10 receives data from the sensor 218 through a wireless network.

A detection unit 19 detects whether or not a person is present in the vicinity based on the sensor data from the sensor 18 or the sensor 218. For example, the detection unit 19 detects that the person P is present in the vicinity by performing image processing on a camera image. The camera image may be an image captured by the sensor 18 installed in the delivery robot 10 or the sensor 18 such as a monitoring camera. The detection unit 19 detects that the person P is present in the vicinity based on point cloud data or the like from LiDAR. Alternatively, the detection unit 19 may detect whether or not a person is present on a floor based on operation information about an elevator and the like.

The detection unit 19 may be mounted in the delivery robot 10 or disposed outside the delivery robot 10. For example, when a server located outside the delivery robot 10 includes the delivery robot 10, the server may send a detection signal indicating that a person has been detected to the delivery robot 10.

The control unit 100 controls a normal operation of the delivery system that includes the delivery robot including the carriage part 130, the elevating part 151, the extendable arm 152, and the like. The control unit 100 can control the rotation of each of the driving wheels 13 and move the base part 11 to any position by transmitting a control signal to each of the motors 1301 of the carriage part 130. The control unit 100 can change a height position of the mounting table 15 by transmitting a control signal to the rotating apparatus 1511 of the elevating part 151. The control unit 100 can also change a horizontal position of the arm body by transmitting a control signal to the driving apparatus 1521 of the extendable arm 152.

The control unit 100 may control the movement of the base part 11 by performing well-known control such as feedback control and robust control based on information about the rotations of the driving wheels 13 detected by a rotation sensor(s) provided in the driving wheels 13. The control unit 100 may control the operations of the carriage part 130, the elevating part 151, and the extendable arm 152 based on information such as information about a distance(s) detected by a distance sensor such as a camera or an ultrasonic sensor provided in the base part 11 and information about a map of the moving environment. The control unit 100 determines, based on the position of an obstacle detected by the camera and the position of a storage shelf, a stop position of the delivery robot relative to the storage shelf and a direction relative to the storage shelf which the delivery robot is facing when it stops.

The control unit 100 includes, for example, a microcomputer including a control program executed by a Central Processing Unit (CPU) 101 that performs control processing, arithmetic processing, etc., a memory 102 including a Read Only Memory (ROM) that stores arithmetic programs etc., and an interface unit (I/F) 103 that inputs and outputs signals to and from the outside. The CPU 101, the memory 102, and the interface unit 103 are connected to one another through a data bus or the like.

(Operation at the Time of Transfer)

When the detection unit 19 detects the person P at the time of transfer, the control unit 100 performs control to protect privacy information. For example, when the delivery robot 10 transfer an article to the storage shelf 30, the delivery robot 10 transfers the article in a transfer form in which privacy information is protected from being revealed to the person P present near the storage shelf 30. The transfer form in which privacy information is protected means a transfer of an article in a state in which the person P present near the storage shelf 30 cannot see privacy information such as the label 21. Thus, privacy information such as the address and the name can be reliably protected. Alternatively, a product name, a brand name, and the like can be prevented from being known by others. Some examples of the transfer form will be described below.

Transfer Form Example 1

Figure 3:
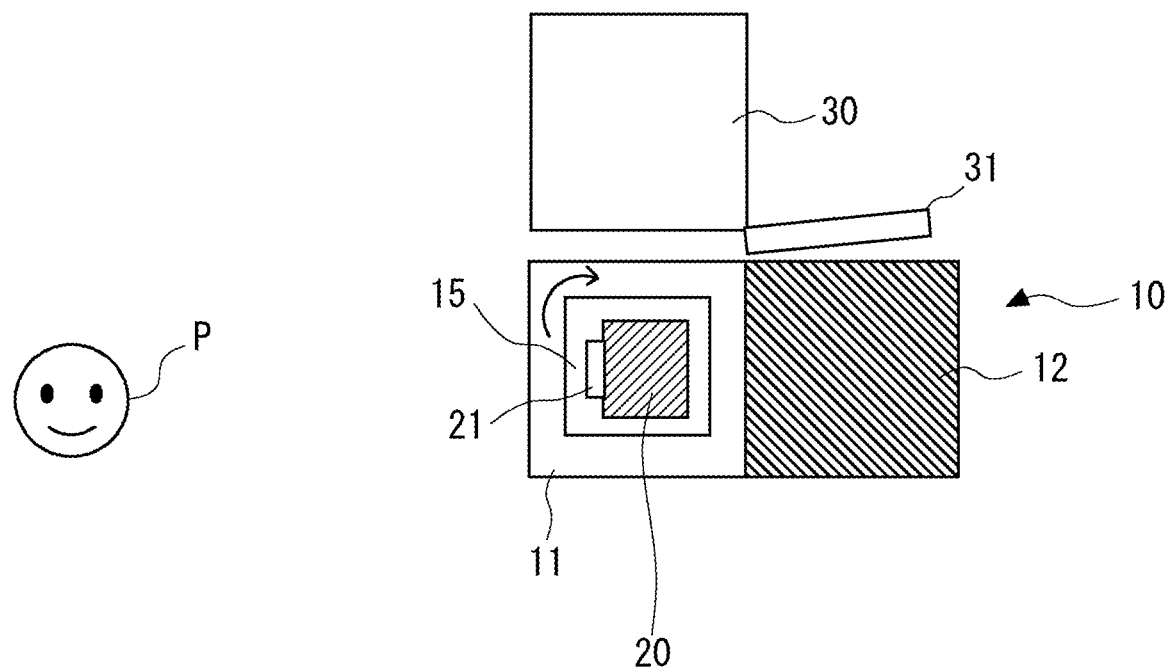
FIG. 3 is a top view for explaining a transfer form in which privacy information is protected by rotation of a mounting table.
Figure 3:
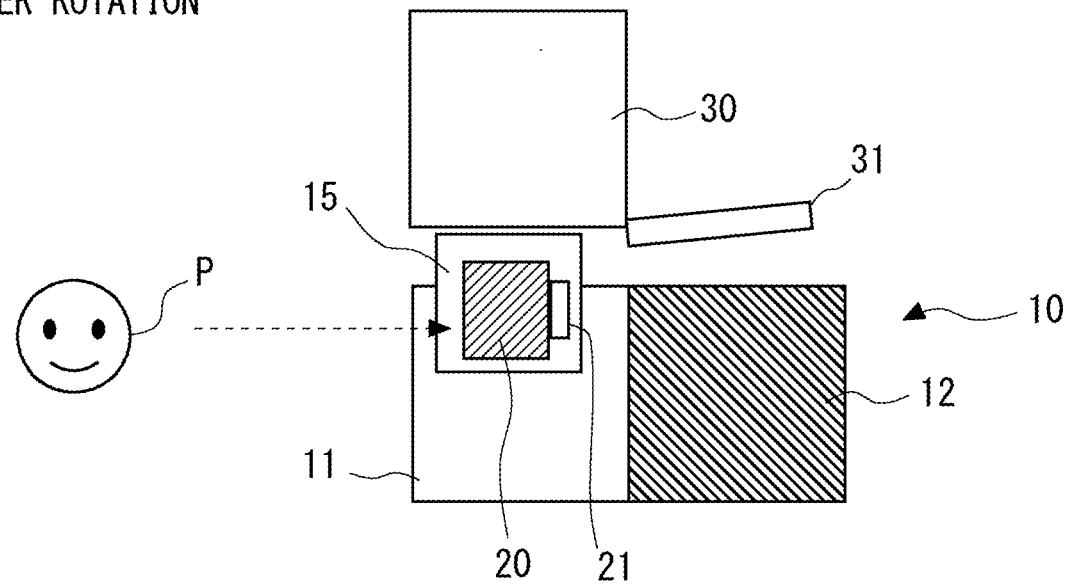

A transfer form example 1 in which privacy information is protected will be described with reference to FIG. 3. FIG. 3 is a top view schematically showing an operation in which the delivery robot 10 transfers the article 20 to the storage shelf 30. When the mounting table 15 rotates the article 20, the orientation of the label 21 changes. The mounting table 15 changes the orientation of the article 20 so that the label 21 faces in a direction opposite to a direction in which the person P is present. The extendable arm 152 transfers the article 20 in a state in which the label is facing in a direction opposite to a direction in which the person P is present.

For example, when the delivery robot 10 moves in front of the storage shelf 30, the delivery robot 10 opens the door 31. Further, the delivery robot 10 takes the article 20 out of the storage part 12. As a result, the delivery robot 10 is in a state before the transfer of the article 20 shown in FIG. 3. At this time, the delivery robot 10 assumes that the person P is walking in front of the delivery robot 10. It is assumed that the label 21 of the article 20 is facing in the direction in which the person P is present.

When the detection unit 19 detects the person P in front of the delivery robot 10, the delivery robot 10 rotates the mounting table 15 according to the direction of the person P. When the mounting table 15 rotates, a side surface of the article 20 on which the label 21 is provided faces in a direction opposite to the direction in which the person P is present. After the rotation of the mounting table 15, the label 21 is in a blind spot of the article 20, and therefore the person P cannot see the label 21. Then the delivery robot 10 transfers the article 20 to the storage shelf 30 in this state. Thus, the delivery robot 10 can transfer the article 20 in a transfer form in which privacy information is protected from being revealed to the person P present near the storage shelf 30.

For example, the position in the article 20 where the label 21 is attached is known. Alternatively, the control unit 100 may detect a position where the label 21 is attached by a camera image or the like. When the detection unit 19 detects the person P, it specifies the direction of the person P with respect to the delivery robot 10. Then the control unit 100 controls the rotating apparatus 1511 so that the label 21 faces in a direction opposite to the direction in which the person P is present. The rotating apparatus 1511 rotates the mounting table 15 to a desired angle, but the label 21 is oriented appropriately. When the rotation of the mounting table 15 is ended, the driving apparatus 1521 extends and contracts the extendable arm 152. Thus, the delivery robot 10 can transfer the article 20 in a transfer form in which privacy information is protected from being revealed to the person P present near the storage shelf 30.

Further, in a transfer form example 2, regardless of the direction of the person P, the delivery robot 10 may transfer the article 20 in a transfer form in which privacy information is protected. For example, it is possible to achieve a transfer form in which privacy information is protected according to a direction in which the article 20 is stored in the storage part 12. The article 20 is stored in the storage part 12 in a state in which the label 21 is facing the rear of the delivery robot 10. When the extendable arm 152 takes the article 20 out of the storage part 12, the label 21 faces the storage part 12 (the label orientation after the rotation shown in FIG. 3). The storage part 12 is higher than a mounting surface of the mounting table 15. A range within which the label 21 can be seen can be reduced. The delivery robot 10 can transfer the article 20 in a transfer form in which privacy information is protected.

As a matter of course, the article 20 may be disposed in the storage part 12 so that the label 21 is on the bottom surface (undersurface) thereof. Alternatively, the mounting table 15 may be rotated so that the label 21 faces the door 31. That is, the delivery robot 10 may transfer the article 20 to the storage shelf 30 in a state in which the label 21 is facing in the direction that is a blind spot for the person P.

Transfer Form Example 2

Figure 4:
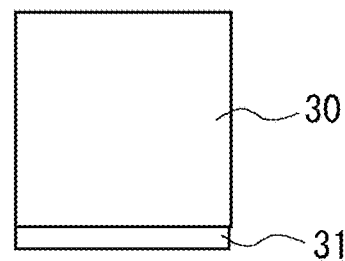
FIG. 4 is a top view for explaining a transfer form in which privacy information is protected by using a direction in which a delivery robot faces.
Figure 4:
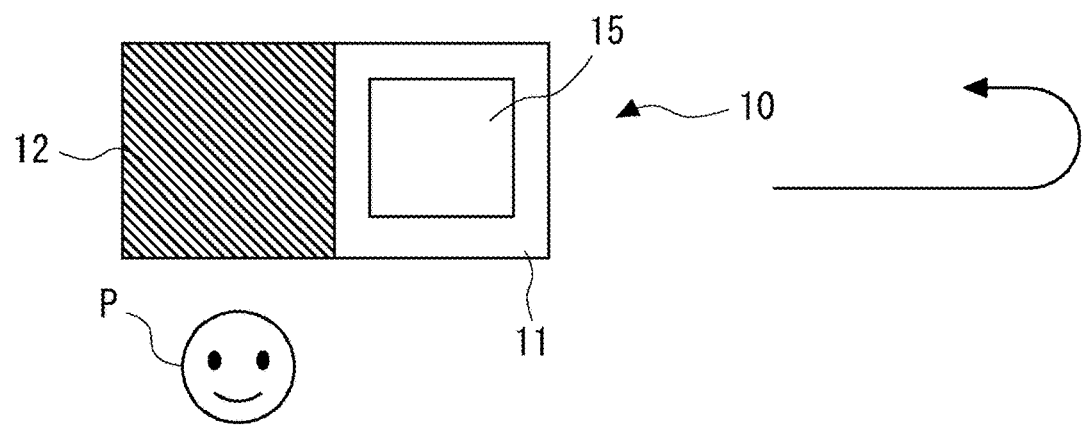
Figure 4:
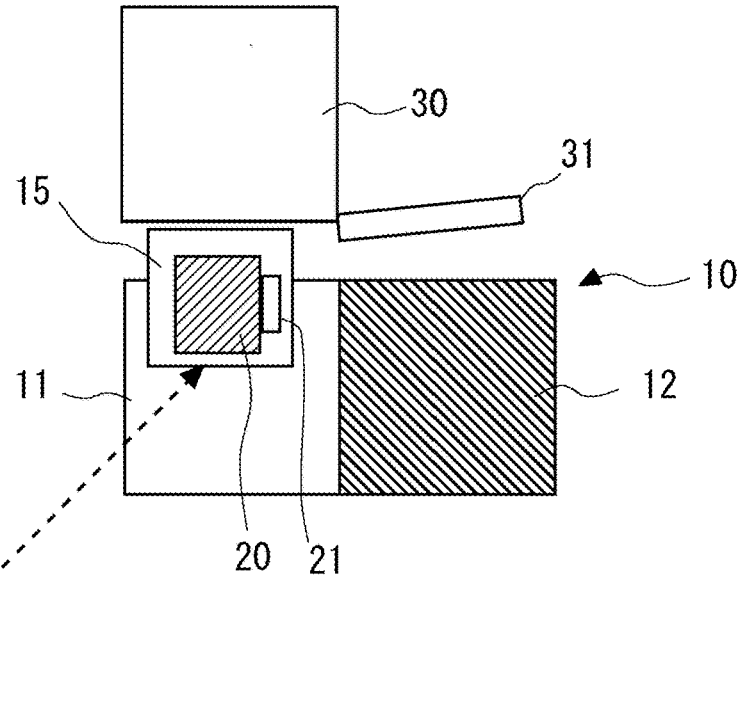

The transfer form example 2 in which privacy information is protected will be described with reference to FIG. 4. FIG. 4 is a top view schematically showing an operation in which the delivery robot 10 transfers the article 20 to the storage shelf 30. In the transfer form example 2, the delivery robot 10 moves, thereby transferring the article in a transfer form in which privacy information is protected. Specifically, the delivery robot 10 moves to a position where the article is transferred to the storage place while the label 21 is facing in the direction opposite to the direction in which the person P is present. The extendable arm 152 transfers the article 20 in a state in which the label 21 is facing in the direction opposite to the direction in which the person P is present.

In FIG. 4, before the transfer of the article 20, the delivery robot 10 is moving from the left side to the right side. The detection unit 19 detects the person P in the vicinity of the storage shelf 30 in front of the storage shelf 30. Then, the delivery robot 10 moves so as to change its direction. Note that the delivery robot 10 has passed through the storage shelf 30 once, and then turned to return to the storage shelf 30. That is, the delivery robot 10 makes a U-turn and moves to a position (hereinafter simply referred to as a transfer position) where the article is transferred to the storage shelf 30. Accordingly, the delivery robot 10 approaches the storage shelf 30 from the left side and reaches the transfer position. The label 21 is facing in the direction opposite to the direction in which the person P is present.

When the delivery robot 10 moves to the transfer position, it takes the article 20 out of the storage part 12. At this time, the article 20 is taken out in a state in which the label 21 is facing in the direction in which the person P is present. Since the label 21 is in a blind spot of the article 20, the person P cannot see the label 21. The delivery robot 10 can transfer the article 20 in a transfer form in which privacy information is protected.

Transfer Form Example 3

Figure 5:
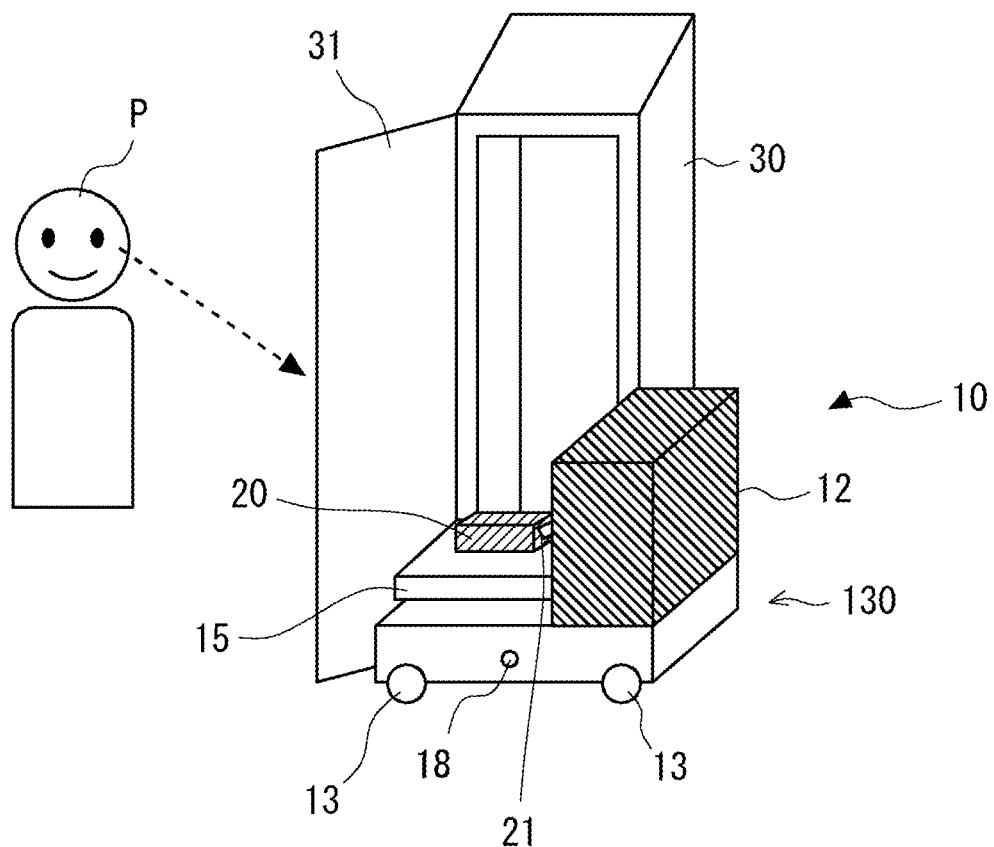
FIG. 5 is a perspective view for explaining a transfer form in which privacy information is protected by using a direction in which a door is opened or closed.

A transfer form example 3 in which privacy information is protected will be described with reference to FIG. 5. FIG. 5 is a perspective view schematically showing a configuration in which the delivery robot 10 transfers an article to the storage shelf 30. In FIG. 5, the delivery robot 10 controls opening and closing of the door 31 so that the door 31 openable in both the left and right directions is opened toward the person P. The door 31 can hide the article 20 from the person P. Therefore, as shown by a dashed arrow in FIG. 3, by the door 31, the article 20 is in a blind spot for the person P. The article 20 can be transferred while the person P cannot see the label 21.

That is, the delivery robot 10 can transfer the article 20 in a transfer form in which privacy information is protected from being revealed to the person P present near the storage shelf 30. The delivery robot 10 may control a direction in which the door 31 is opened or closed and an angle at which the door 31 is opened or closed. Thus, privacy information can be reliably protected. By controlling a direction in which the door 31 is opened or closed, the article 20 is in a transfer form in which privacy information is protected.

According to at least one of the transfer form examples 1 to 3, the delivery robot 10 can be transfer in a state in which the label 21 is hidden from the person P. It should be noted that each of the transfer form examples 1 to 3 may be implemented independently of each other, or two or more examples may be used in combination. For example, privacy information may be protected by both the opening and closing direction of the door 31 and the rotation of article 20. Alternatively, privacy information may be protected by both the direction in which the door 31 is opened or closed and the direction in which the delivery robot 10 faces. Thus, privacy information can be reliably protected.

In the above description, an example in which the delivery robot 10 transfers the article 20 to the storage shelf 30 has been described, but the delivery system 1 can apply a similar transfer form to an example in which the delivery robot 10 receives the article 20 in the storage shelf 30. In this case, the delivery robot 10 may capture an image of the article 20 with a camera before receiving it, and specify the position to which privacy information is attached from the image.

Further, the detection unit 19 may specify the person P. The detection unit 19 may determine whether or not the specified person P is a person whose privacy information should be protected. When the person P is a receiver of the article 20, there is no need to protect privacy information. When the nearby person P is a receiver, the delivery robot 10 transfers the article in a transfer form (non-protection form) other than the transfer form in which privacy information is protected. For example, whether or not the person P is a receiver is determined by face recognition using a face image. Face images or the like of persons whose privacy information does not need be protected may be registered in advance in a memory or the like.

As a matter of course, persons whose privacy information does not need be protected are not limited to receivers themselves. Even when the person P is a family member or a housemate of the receiver, the delivery system 1 may transfer the article 20 to the storage shelf 30 in a non-protection form. In other words, the delivery system 1 may employ a transfer form in which privacy information is protected when a person who does not have some relationship with the article 20 is present in the vicinity, and may employ a non-protection form when a person who has some relationship with the article 20 is present in the vicinity.

Further, in the above description, privacy information is attached to only one side of the article 20, but privacy information may be attached to two or more sides thereof. For example, the label 21 is attached to one side thereof, and a brand name or the like may be printed on the adjacent side thereof. In this case, the delivery system 1 may set the article 20 so that two sides thereof cannot be seen by the person P. Alternatively, the delivery system 1 may set the article 20 so that only one side thereof cannot be seen by the person P. In this case, for more important privacy information such as the address and the name, the delivery system 1 preferably prepares information which the person P cannot recognize.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system configured to deliver a package, privacy information being attached to the package, the delivery system comprising:
    a mobile robot configured to deliver the package;
    a transfer mechanism configured to transfer the package delivered by the mobile robot to a storage place or transfer the package located in the storage place to the mobile robot; and
    a detection unit configured to detect whether or not a person is present near the storage place,
    wherein the package is transferred in a transfer form in which the privacy information is protected from being revealed to the person present near the storage place.

2. The delivery system according to claim 1, further comprising a driving mechanism configured to change an orientation of the package so that the privacy information faces in a direction opposite to a direction in which the person is present,
    wherein the transfer mechanism transfers the package in a state in which the privacy information is facing in the direction opposite to the direction in which the person is present.

3. The delivery system according to claim 1, wherein
    the mobile robot moves to a position where the package is transferred to the storage place while the privacy information is facing in the direction opposite to the direction in which the person is present, and
    the transfer mechanism transfers the package in a state in which the privacy information is facing in the direction opposite to the direction in which the person is present.

4. The delivery system according to claim 1, comprising a door configured to be opened and closed in both left and right directions, the door being provided in the storage place,
    wherein the transfer mechanism transfers the package in a state in which the door is opened in the direction in which the person is present.

5. The delivery system according to claim 1, wherein the package is transferred in a transfer form other than the transfer form in which the privacy information is protected when the person present near the storage place is a person who has some relationship with the package.

* * * * *